United States Patent
Wu et al.

(10) Patent No.: US 12,096,440 B2
(45) Date of Patent: Sep. 17, 2024

(54) TRANSMISSION METHOD AND DEVICE FOR UPLINK CONTROL INFORMATION

(71) Applicant: GUANGDONG OPPO MOBILE TELECOMMUNICATIONS CORP., LTD., Guangdong (CN)

(72) Inventors: Zuomin Wu, Dongguan (CN); Yanan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 371 days.

(21) Appl. No.: 17/547,079

(22) Filed: Dec. 9, 2021

(65) Prior Publication Data
US 2022/0104242 A1    Mar. 31, 2022

Related U.S. Application Data

(63) Continuation of application No. PCT/CN2019/109771, filed on Sep. 30, 2019.

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04L 5/0051* (2013.01);
(Continued)

(58) Field of Classification Search
CPC ............. H04W 72/21; H04W 72/0453; H04W 72/1268; H04W 72/23; H04W 72/542;
(Continued)

(56) References Cited

U.S. PATENT DOCUMENTS 11,121,825 B2 * 9/2021 Huang ................. H04W 72/21
2018/0167931 A1 * 6/2018 Papasakellariou .... H04L 5/0094
(Continued)

FOREIGN PATENT DOCUMENTS

| CN | 109714827 A | 5/2019 |
| CN | 109788561 A | 5/2019 |

(Continued)

OTHER PUBLICATIONS

The first Office Action of corresponding European application No. 19948193.8, dated Feb. 6, 2023.
(Continued)

*Primary Examiner* — Austin J Moreau
(74) *Attorney, Agent, or Firm* — Ladas & Parry, LLP

(57) ABSTRACT

Embodiments of the present application provide a transmission method and device for uplink control information. The method includes: a UE maps target uplink control information to a PUSCH, the PUSCH being transmitted through a pre-configured grant-uplink resource, the target uplink control information including first uplink control information, and the first uplink control information including control information for demodulating the PUSCH; and sends the PUSCH to a network device through the pre-configured
(Continued)

grant-uplink resource. In the embodiments of the present application, when target uplink control information needs to be transmitted, a UE can map the target uplink control information to a PUSCH, and then sends the PUSCH through a pre-configured grant-uplink resource, thereby realizing the transmission of the target uplink control information.

18 Claims, 8 Drawing Sheets

(51) Int. Cl.
| | | |
|---|---|---|
| H04L 5/00 | (2006.01) | |
| H04W 72/0453 | (2023.01) | |
| H04W 72/1268 | (2023.01) | |
| H04W 72/23 | (2023.01) | |
| H04W 72/542 | (2023.01) | |
| H04W 72/56 | (2023.01) | |

(52) U.S. Cl.
CPC ... *H04W 72/0453* (2013.01); *H04W 72/1268* (2013.01); *H04W 72/23* (2023.01); *H04W 72/542* (2023.01); *H04W 72/56* (2023.01)

(58) Field of Classification Search
CPC ... H04W 72/56; H04W 72/115; H04L 1/1812; H04L 5/0051; H04L 1/007; H04L 1/0073; H04L 1/1854; H04L 1/0026; H04L 1/1887; H04L 1/1893; H04L 5/0044; H04L 5/0048; H04L 5/0055; H04L 5/0057
See application file for complete search history.

(56) References Cited

U.S. PATENT DOCUMENTS

| | | | |
|---|---|---|---|
| 2019/0199477 A1 | 6/2019 | Park et al. | |
| 2021/0007129 A1* | 1/2021 | Talarico | H04W 72/1268 |
| 2021/0037517 A1* | 2/2021 | Lei | H04W 72/21 |
| 2022/0007273 A1* | 1/2022 | Guzelgoz | H04B 7/0626 |

FOREIGN PATENT DOCUMENTS

| | | | | |
|---|---|---|---|---|
| CN | 110035522 A | 7/2019 | | |
| WO | WO-2020024790 A1 * | 2/2002 | ......... | H04L 25/0226 |
| WO | 2019030237 A1 | 2/2019 | | |
| WO | 2021/062842 A1 | 4/2021 | | |

OTHER PUBLICATIONS

The first Office Action and search report of corresponding Chinese application No. 202210050005.X, dated Feb. 23, 2023, and its English translation provided by the client.
International Search Report (ISR) dated Jun. 30, 2020 for Application No. PCT/CN2019/109771, and its English translation provided by WIPO.
Written Opinion dated Jun. 30, 2020 for Application No. PCT/CN2019/109771, and its English translation provided by Google Translate.
VIVO:"Discussion on the enhancements to configured grants" 3GPP TSG RAN WG1 #97, R1-1906133, May 13-17, 2019, entire document.
The Notice of Rejection of corresponding Chinese application No. 202210050005.X, dated Aug. 9, 2023 with machine translation provided by the applicant's foreign counsel.
The second Office Action of corresponding Chinese application No. 202210050005.X, dated May 26, 2023 with machine translation provided by the applicant's foreign counsel . . . .
The second Office Action of corresponding European application No. 19948193.8, dated Jul. 20, 2023.
The Extended European Search Report of corresponding European application No. 19948193.8, dated May 9, 2022.
The first Office Action of corresponding Indian application No. 202117056521, dated Jun. 20, 2022.
VIVO: "Discussion on the enhancements to configured grants", 3GPP Draft; R1-1906133 Discussion On Enhancements To Configured Grants, 3RD Generation Partnership Project (3GPP), Mobile Competence Centre; 650, Route Des Lucioles; F-06921 Sophia-Antipolis Cedex; France, vol. RAN WGI May 1, 2019 (May 1, 2019), pp. 1-10, XP051708174.
Intel Corporation: "Enhancements to configured grants for NR-unlicensed", 3GPP Draft; R1-1908627—Intel Configured Grant for NR-U, 3rd Generation Partnership Project (3GPP), Mobile Competence Centre ; 650, Route Des Lucioles; F-06921 Sophia-Antipolis Cedex ; France, vol. RAN WGI, No. Prague, Czechia; Aug. 26, 2019-Aug. 30, 2019 Aug. 17, 2019 (Aug. 17, 2019), XP051765235.

* cited by examiner

Receiving a PUSCH sent by a UE through a pre-configured grant-uplink resource, where the PUSCH is mapped with target uplink control information, the target uplink control information includes first uplink control information, and the first uplink control information includes control information for demodulating the PUSCH — S1301
FIG. 13
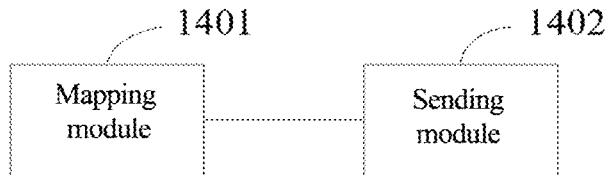
FIG. 14
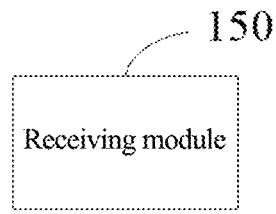
FIG. 15

TRANSMISSION METHOD AND DEVICE FOR UPLINK CONTROL INFORMATION

CROSS-REFERENCE TO RELATED APPLICATION

This application is a continuation of International Application No. PCT/CN2019/109771, filed on Sep. 30, 2019, the content of which is incorporated herein by reference in its entirety.

TECHNICAL FIELD

Embodiments of the present application relate to the field of wireless communication technologies, in particular to a transmission method and device for uplink control information.

BACKGROUND

In a new radio (NR) system, uplink control information (Uplink Control Information, abbreviated as: UCI) carried on a physical uplink shared channel (PUSCH) includes hybrid automatic repeat request (HARQ)-acknowledgement information and/or channel state information (CSI). In order to ensure transmission reliability of the HARQ information, the HARQ and the CSI are encoded independently. When the CSI is composed of two parts including first CSI and second CSI, the first CSI (CSI Part 1) and the second CSI (CSI Part 2) are also encoded independently, and the purpose is also to ensure transmission of the CSI Part 1 with higher reliability requirements.

Currently, in a new radio unlicensed (NR-U) system, uplink transmission based on a pre-configured grant (CG) PUSCH is supported, which is represented by CG-PUSCH in the present application. The CG-PUSCH can carry pre-configured grant-uplink control information (CG-UCI). That is, the UCI that needs to be transmitted currently may include: CG-UCI, HARQ, CSI Part 1 and CSI Part 2.

However, how to transmit the UCI that may include CG-UCI, HARQ, CSI Part 1 and CSI Part 2 remains to be solved.

SUMMARY

In a first aspect, the present application provides a transmission method for uplink control information, which is applied to a user equipment (UE), and the method includes:
  mapping target uplink control information to a PUSCH, where the PUSCH is transmitted through a pre-configured grant-uplink resource, the target uplink control information includes first uplink control information, and the first uplink control information includes control information for demodulating the PUSCH; and
  sending the PUSCH through the pre-configured grant-uplink resource.

In a second aspect, an embodiment of the present application provides a transmission method for uplink control information, which is applied to a network device, and the method includes:
  receiving a PUSCH sent by the a UE through a pre-configured grant-uplink resource, where the PUSCH is mapped with target uplink control information, the target uplink control information includes first uplink control information, and the first uplink control information includes the control information for demodulating the PUSCH.

In a third aspect, the present application provides a transmission apparatus for uplink control information, which is applied to a UE, and the apparatus includes:
  a mapping module, configured to map target uplink control information to a PUSCH, where the PUSCH is transmitted through a pre-configured grant-uplink resource. The target uplink control information includes first uplink control information, and the first uplink control information includes control information for demodulating the PUSCH; and
  a sending module, configured to send the PUSCH through the pre-configured grant-uplink resource.

In a fourth aspect, the present application provides a transmission apparatus for uplink control information, which is applied to a network device, and the apparatus includes:
  a receiving module, configured to receive a PUSCH sent by a UE through a pre-configured grant-uplink resource, where the PUSCH is mapped with the target uplink control information, the target uplink control information includes first uplink control information, and the first uplink control information includes control information for demodulating the PUSCH.

In a fifth aspect, the present application provides a user equipment including at least one processor and a memory;
  the memory stores computer execution instructions;
  the at least one processor executes the computer execution instructions stored in the memory so that the at least one processor executes the transmission method for uplink control information as provided in the first aspect.

In a sixth aspect, the present application provides a network device including at least one processor and a memory;
  the memory stores computer execution instructions;
  the at least one processor executes the computer execution instructions stored in the memory so that the at least one processor executes the transmission method for uplink control information as provided in the second aspect.

In a seventh aspect, the present application provides a computer-readable storage medium in which computer execution instructions are stored. When a processor executes the computer execution instructions, the transmission method for uplink control information provided in the first aspect is realized.

In an eighth aspect, the present application provides a computer-readable storage medium in which computer execution instructions are stored. When a processor executes the computer execution instructions, the transmission method for uplink control information provided in the second aspect is realized.

The embodiments of the present application provide a transmission method and device for uplink control information. The method includes that: a UE maps target uplink control information to a PUSCH, the PUSCH being transmitted through a pre-configured grant-uplink resource, the target uplink control information including first uplink control information, the first uplink control information including control information for demodulating the PUSCH; and sends the PUSCH to a network device through the pre-configured grant-uplink resource. That is, in the embodiments of the present application, when target uplink control information needs to be transmitted, a UE can map the target uplink control information to a PUSCH, and then sends the PUSCH through a pre-configured grant-uplink resource, thereby realizing the transmission of the target uplink control information.

BRIEF DESCRIPTION OF THE DRAWINGS

In order to more clearly explain the embodiments of the present application or the technical solutions in the prior art, the following will briefly introduce the drawings that need to be used in the embodiments or the prior art description. It is obvious that the drawings in the following description are some embodiments of the present application. For those skilled in the art, other drawings can also be obtained from these drawings without paying creative labor.

FIG. 13 is a second flowchart of a transmission method for uplink control information provided by an embodiment of the present application;

FIG. 14 is a first schematic block diagram of a transmission apparatus for uplink control information provided by an embodiment of the present application;

FIG. 15 is a second schematic block diagram of a transmission apparatus for uplink control information provided by an embodiment of the present application.

DESCRIPTION OF EMBODIMENTS

In order to make the purpose, technical solutions and advantages of the embodiments of the present application clearer, the technical solutions in the embodiments of the present application will be clearly and completely described below in combination with the accompanying drawings in the embodiments of the present application. Obviously, the described embodiments are part of the embodiments of the present application, not all of the embodiments. Based on the embodiments in the present application, all other embodiments obtained by those skilled in the art without paying creative work belong to the scope of protection of the present application.

It should be noted that in the embodiments of the present application, the term "and/or" is only an association relationship describing associated objects, indicating that there can be three kinds of relationships, for example, A and/or B, which can mean that there are three cases: A existing alone, A and B existing at the same time, and B existing alone. In addition, the character "/" in this paper generally means that the front and rear associated objects are in an "or" relationship.

The embodiments of the present application can be applied to various communication systems, such as a global system of mobile communication (GSM), a code division multiple access (CDMA) system, a wideband code division multiple access (WCDMA) system, a general packet radio service GPRS, a long term evolution (LTE) system, an advanced long term evolution (LTE-A) system, a new radio (NR) system, an evolution system of NR system, an LTE-based access to unlicensed spectrum (LTE-U) system, an NR-based access to unlicensed spectrum (NR-U) system, a universal mobile telecommunications system (UMTS), a wireless local area network (WLAN), a wireless fidelity (WiFi), a next generation communication system or other communication systems, etc.

Generally speaking, the number of connections supported by a traditional communication system is limited and easy to be implemented. However, with the development of communication technology, mobile communication systems will not only support traditional communication, but also support, for example, device to device (D2D) communication, machine to machine (M2M) communication, machine type communication (MTC), and vehicle to vehicle (V2V) communication, etc. The embodiments of the present application can also be applied to these communication systems.

In an embodiment, the communication system in the embodiments of the present application can be applied to a carrier aggregation (CA) scenario, can also be applied to a dual connectivity (DC) scenario, and can also be applied to a standalone (SA) network deployment scenario.

The spectrum to which the embodiments of the present application is not limited herein. For example, the embodiments of the present application can be applied to a licensed spectrum or unlicensed spectrum.

Figure 1:
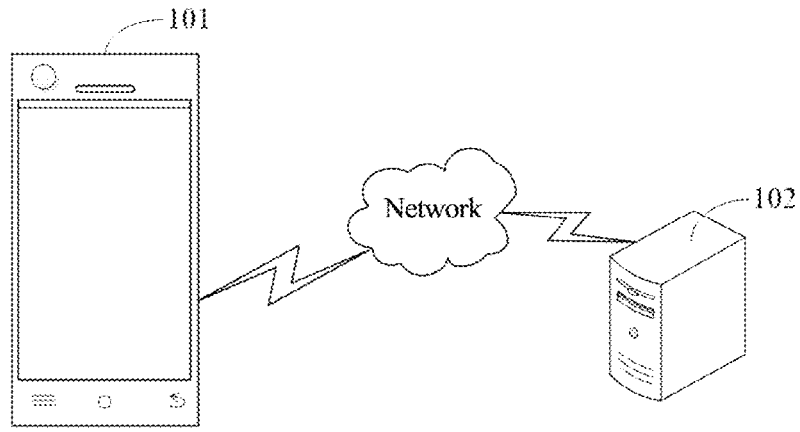
FIG. 1 is a schematic structural diagram of an uplink control information transmission system provided by an embodiment of the present application.

Referring to FIG. 1, FIG. 1 is an architecture diagram of a transmission system for uplink control information provided by an embodiment of the present application. The transmission system for uplink control information provided by the present embodiment includes a UE 101 and a network device 102.

In an embodiment, the UE 101 may refer to various forms of user equipment, access terminal, user unit, user station, mobile station (MS), remote station, remote terminal, mobile device, terminal equipment, wireless communication device, user agent or user device. It can also be a cellular telephone, a cordless telephone, a session initiation protocol (SIP) telephone, a wireless local loop (WLL) station, a personal digital assistant (PDA), a handheld device with wireless communication functions, a computing device or other processing device connected to a wireless modem, an in-vehicle devices, a wearable devices, a terminal device in the future 5G network or a terminal device in evolution of a public land mobile network (PLMN), etc., which are not limited in the embodiments of the present application, as long as the UE 101 can communicate wirelessly with the network device 102.

The embodiments of the present application define a one-way communication link from an access network to a UE as a downlink, data transmitted over the downlink is downlink data, and a transmission direction of the downlink data is called downlink direction; a one-way communication link from the UE to the access network is an uplink, data transmitted over the uplink is uplink data, and a transmission direction of the uplink data is called uplink direction.

In an embodiment, the network device 102, that is, a public mobile communication network device, is an interface device for the UE 101 to access the Internet and a form of radio station. It refers to a radio transceiver station for information transmission with the UE 101 in a certain radio coverage area, including a base station (BS), which can also be called base station equipment and is an apparatus deployed in a radio access network (RAN) to provide wireless communication functions. For example, a device providing base station functions in a 2G network includes a base transceiver station (BTS), a device providing base station functions in a 3G network includes a node B, a device providing base station functions in a 4G network includes an evolved node B (eNB), and in wireless local area networks (WLAN), devices providing base station functions are access points (AP), a device providing base station functions in a 5G NR is a gNB, and a continuously evolving node B (ng-eNB). The NR technology is used for communication between the gNB and the UE, and the evolved universal terrestrial radio access (E-UTRA) technology is used for communication between the ng-eNB and the UE, both the gNB and the ng-eNB can be connected to a 5G core network. The network device 102 in the embodiments of the present application also includes a device that provides base station functions in a new communication system in the future.

In the embodiments of the present application, the UE 101 is connected with the network device 102 via a wireless communication network. The transmission method for uplink control information in the embodiments of the present application can be performed by the UE 101, the network device 102, or both the UE 101 and the network device 102. For example, in some embodiments, the network device 102 sends a message to the UE 101; after receiving the message, the UE 101 performs corresponding tasks based on the notification message, and then sends a response message to the network device 102. Detailed embodiments are described in detail below.

In the embodiments of the present application, in an autonomous uplink (AUL) independently scheduled by the UE, the network device configures a time domain resource that can be used for AUL transmission through radio resource control (RRC), and dynamically activates the time domain resource through downlink control information (DCI), and the DCI dynamically indicates a frequency domain resource that can be used by the UE on the time domain resource. After receiving DCI activation signaling, the UE transmits a PUSCH on the AUL resource. The PUSCH carries UCI, and the UCI includes indication information for demodulating the PUSCH, specifically including a cell-radio network temporary identifier (C-RNTI), an AUL C-RNTI, a HARQ process identifier, a redundancy version (RV), a new data indicator (NDI), a start position of the PUSCH (the indication for the start position of the PUSCH includes 1 bit, which can be a symbol 0 or a symbol 1), an end position of the PUSCH (the indication for the end position of the PUSCH includes 1 bit, which can be a symbol 12 or a symbol 13), and a channel occupancy time (COT) sharing indication. In addition, the UCI includes a cyclic redundancy check (CRC) code of 16 bits for the network device to confirm whether the UCI is correctly received.

In a mapping process of uplink data, for simplifying implementation, the data is always mapped from the symbol 0. If the start position of the PUSCH is the symbol 1 and the end position is the symbol 12, the UE will not transmit the symbol 0 and the symbol 13 by punching. Among them, the UE does not transmit the symbol 0 or the symbol 13 in order to leave a listen before talk (LBT) gap for other UEs, so as to better realize multi-user multiplex transmission.

In an NR-U system, a CG-PUSCH can carry CG-UCI. The CG-UCI includes indication information for demodulating the CG-PUSCH. For example, the CG-UCI can include at least the following information: a HARQ process identifier, an RV, an NDI and a COT sharing indication.

In an embodiment, when a physical uplink control channel (PUCCH) and a CG-PUSCH overlap in the time domain, the UCI information can be carried and transmitted on the CG-PUSCH.

The UCI information carried on the CG-PUSCH may include first UCI in addition to the CG-UCI. The first UCI includes one or more of the following information: HARQ information, a CSI Part 1 and a CSI Part 2.

In an embodiment, the HARQ information includes: HARQ positive acknowledgement (ACK) or HARQ negative acknowledgement (NACK). In an embodiment, the CG-UCI can be encoded independently. In an embodiment, the CRC used in independent encoding of the CG-UCI can be configured by a high-level parameter or determined according to a radio network temporary identifier (RNTI) or a configured scheduling-radio network temporary identifier (CS-RNTI) corresponding to the CG-PUSCH transmission.

In an embodiment, in order to ensure transmission reliability of the CG-UCI on the CG-PUSCH, a code rate compensation factor can also be defined for the CG-UCI information, that is, more resources can be allocated to the CG-UCI with the same bit(s), and the transmission reliability of the CG-UCI can be improved by reducing occurrence of the CG-UCI code rate.

In an embodiment, if DCI signaling that activates the CG-PUSCH includes an indicator field for the code rate compensation factor, a set can be semi-statically configured for the UE through the high-level signaling, and then the code rate compensation factor can be dynamically indicated to the UE through the DCI.

In an embodiment, if the DCI signaling that activates the CG-PUSCH does not include an indicator field for the code rate compensation factor, or the CG-PUSCH does not need DCI activation, then the code rate compensation factor is a parameter ($\beta$) configured through a high-level parameter.

When CG-PUSCH carries uplink data, a high-level signaling configuration parameter ($\alpha$) can also be introduced for the transmission of the CG-UCI information, this parameter ($\alpha$) is used to limit an upper limit of the number of resources occupied by the CG-UCI information.

When CG-PUSCH does not carry uplink data, the number of resources occupied by the CG-UCI can be calculated by at least one of the total number of bits, a reference code rate, a modulation order and a code rate compensation factor ($\beta$), etc., of the CG-UCI information. In an embodiment, the reference code rate and the modulation order can be semi-statically configured by high-level signaling or indicated by the DCI signaling that activates the CG-PUSCH.

Because the four types of UCI information, the CG-UCI, HARQ, CSI Part 1 and CSI Part 2, are encoded independently. When it is necessary to transmit three or less of the four types of UCI information, the UE can carry the UCI information to be transmitted on the PUSCH. When it is necessary to transmit these four types of UCI information, considering the low priority of the second CSI (CSI Part 2), the UE can discard the transmission of the second CSI.

Since the CG-UCI includes indication information for demodulating the CG-PUSCH, it can be considered to be there in the CG-PUSCH. Therefore, a mapping position of the CG-UCI in the PUSCH can be fixed so that the CG-UCI can be detected at the fixed position first for determining whether the CG-PUSCH has been transmitted when the network device performs detection on the CG resource, thus, blind detection complexity of the network device can be reduced.

Figure 2:
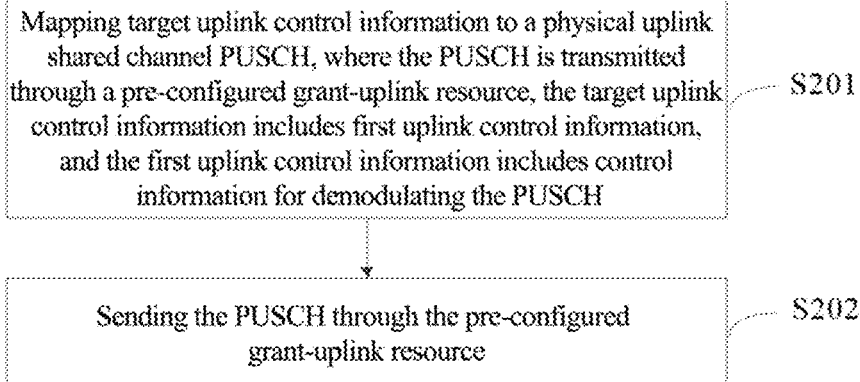
FIG. 2 is a first schematic flowchart of a transmission method for uplink control information provided by an embodiment of the present application.

In an embodiment of the present application, a transmission method for uplink control information is applied to a UE. Referring to FIG. 2, FIG. 2 is a first flow diagram of the transmission method for uplink control information provided by the embodiment of the present application. The method includes at least part of the following contents:

S201: mapping target uplink control information to a physical uplink shared channel PUSCH, where the PUSCH is transmitted through a pre-configured grant-uplink resource, the target uplink control information includes first uplink control information, and the first uplink control information includes control information for demodulating the PUSCH; and S202: sending the PUSCH through the pre-configured grant-uplink resource.

In an embodiment, in the embodiment of the present application, the UE first acquires a mapping parameter and UCI that needs to be transmitted, and the mapping parameter is used to represent a mapping relationship between UCI and a PUSCH resource. For example, the mapping parameter can be used to indicate a mapping position of some or all information in the UCI on the PUSCH resource, or a mapping order relationship of some or all information in the UCI on the PUSCH resource, or is used to determine the number of resources occupied by the UCI in the pre-configured grant-uplink resource.

In an embodiment, the mapping parameter can be pre-configured in a data transmission protocol, or indicated by a network device.

In an embodiment, each information contained in the UCI can be mapped to the PUSCH to realize sending of all information in the UCI; or, some information contained in the UCI can be mapped to the PUSCH to realize sending of some information in the UCI.

For example, after mapping the CG-UCI in the UCI to a first resource in the PUSCH resource, sending the CG-UCI with the first resource.

The transmission method for uplink control information provided by the embodiments of the present application includes that: a UE maps target uplink control information to a PUSCH, the PUSCH being transmitted through a pre-configured grant-uplink resource, the target uplink control information including first uplink control information, and the first uplink control information including control information for demodulating the PUSCH; and sends the PUSCH to the network device through the pre-configured grant-uplink resource. That is, in the embodiments of the present application, when the target uplink control information needs to be transmitted, the UE can map the target uplink control information to the PUSCH, and then send the PUSCH through the pre-configured grant-uplink resource, so as to realize the transmission of the target uplink control information.

In an embodiment, based on the content described in the above embodiments, in a feasible embodiment of the present application, mapping the target uplink control information to the PUSCH in the aforementioned step S201 includes:

mapping the first uplink control information from a first symbol in the PUSCH onto consecutive X symbols in the PUSCH according to a frequency domain priority principle, where the first symbol is a first PUSCH symbol after a first demodulation reference signal (DMRS) symbol in the PUSCH, and X is an integer greater than or equal to 1.

In this embodiment, when X=1, mapping the first uplink control information to the first symbol in the PUSCH according to the frequency domain priority principle.

In an embodiment, the DMRS is used to demodulate the PUSCH. Generally, the closer the resource mapping position with respect to the resource corresponding to the DMRS is, the better the demodulation performance becomes.

In an embodiment, the first uplink control information may include CG-UCI.

In a feasible embodiment, a DMRS symbol is used to transmit a DMRS, and a PUSCH symbol is used to transmit uplink control information and/or an uplink data channel. The PUSCH includes the DMRS symbol and the PUSCH symbol.

The frequency domain priority principle (also called frequency first then time principle) may include: in a process of mapping, priority is given to mapping on the frequency domain resource corresponding to a current symbol, and after the frequency domain resource corresponding to the current symbol is mapped, mapping on the frequency domain resource corresponding to a next symbol after the current symbol. Exemplary, it is assumed that the resource to be mapped includes L symbols. During mapping, first mapping on a first symbol of the L symbols in an order from a smallest frequency domain unit number to a largest frequency domain unit number, and then mapping on a second symbol of the L symbols in an order from a smallest frequency domain unit number to a largest frequency domain unit number, until mapping is done on frequency domain units in all L symbols.

In an embodiment, in the embodiments of the present application, a frequency domain unit may refer to a resource element (RE) or a subcarrier, or a resource block (RB), which is not limited in the present application.

In an embodiment, the target uplink control information also includes second uplink control information, in step S201, the mapping the target uplink control information to the PUSCH in the aforementioned step S201 including:

mapping the second uplink control information from a second symbol in the PUSCH onto consecutive Y symbols in the PUSCH according to the frequency domain priority principle, where the second symbol is a last symbol of the X symbols, or the second symbol is a first PUSCH symbol after the X symbols, and Y is an integer greater than or equal to 1.

In the embodiment, when Y=1, mapping the second uplink control information to the second symbol in the PUSCH according to the frequency domain priority principle.

When the second symbol is a last symbol of the X symbols, the second uplink control information is not mapped to a resource in the second symbol that has been used to map the first uplink control information. That is, the second uplink control information can be mapped to other remaining resource(s) in the second symbol other than the resource that has been used to map the first uplink control information.

In an embodiment, the second uplink control information includes HARQ information, and the number of bits of the HARQ information is greater than a preset threshold. Exemplary, the preset threshold may be 2 bits.

In the embodiments of the present application, when the target uplink control information includes CG-UCI and HARQ information, if the number of bits of HARQ information is greater than the preset threshold and there is HARQ information that needs to be transmitted, mapping the CG-UCI from a first symbol in the PUSCH onto consecutive X symbols in the PUSCH according to the frequency domain priority principle, where the first symbol is a first PUSCH symbol after a first DMRS symbol in the PUSCH, and X is an integer greater than or equal to 1. Then mapping the HARQ information that needs to be transmitted from a second symbol in the PUSCH onto consecutive Y symbols in the PUSCH, where the second symbol is a last symbol of the X symbols, or the second symbol is a first PUSCH symbol after the X symbols, and Y is an integer greater than or equal to 1.

In an embodiment, when the second symbol is the last symbol of the X symbols, it means that the last symbol of the X symbols has remaining frequency domain resources after being mapped with the CG-UCI, and these remaining frequency domain resources can be used to map the HARQ information.

In an embodiment, the target uplink control information also includes third uplink control information, where, when the second uplink control information includes HARQ information, the third uplink control information includes a CSI Part 1; or, when the second uplink control information does not include HARQ information and includes the CSI Part 1, the third uplink control information includes a CSI Part 2.

In an embodiment, when the second uplink control information includes the HARQ information, the CG-UCI, the HARQ information and the CSI Part 1 can be mapped to the PUSCH.

Figure 3:
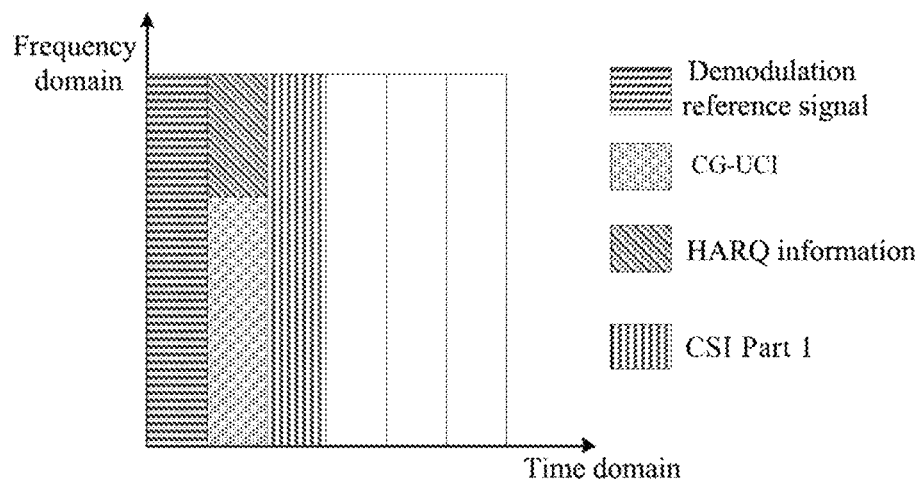
FIG. 3 is a first schematic diagram of resource mapping in a transmission method for uplink control information provided by an embodiment of the present application.
Figure 4:
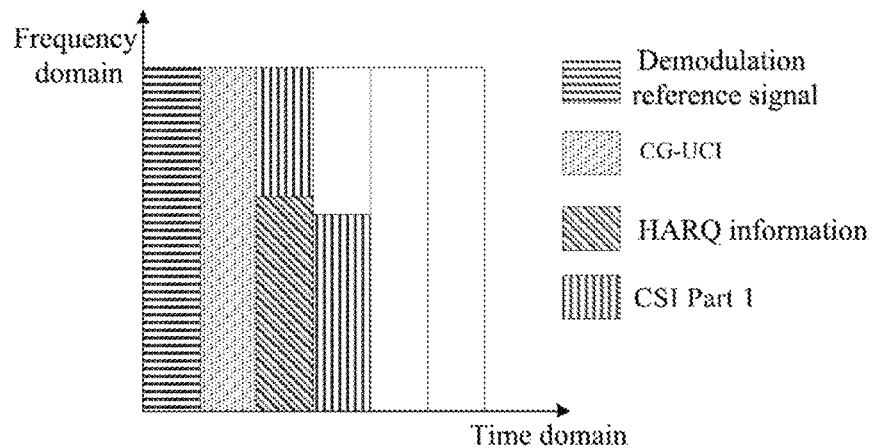
FIG. 4 is a second schematic diagram of resource mapping in a transmission method for uplink control information provided by an embodiment of the present application.

In order to better understand the embodiments of the present application, referring to FIG. 3, FIG. 3 is a first schematic diagram of resource mapping in a transmission method for uplink control information provided by an embodiment of the present application. In FIG. 3, assuming X=1 and Y=1, the second symbol is a last symbol of the X symbols. Referring to FIG. 4, FIG. 4 is a second schematic diagram of resource mapping in a transmission method for uplink control information provided by an embodiment of the present application. In FIG. 4, assuming X=1 and Y=1, the second symbol is a first PUSCH symbol after the X symbols.

In an embodiment, when the second uplink control information does not include HARQ information, the second uplink control information includes a first channel state information part CSI Part 1. In this case, mapping CG-UCI from a first symbol in the PUSCH onto consecutive X symbols in the PUSCH according to the frequency domain priority principle, where the first symbol is a first PUSCH symbol after a first DMRS symbol in the PUSCH, and X is an integer greater than or equal to 1. Then mapping the CSI Part 1 from a second symbol in the PUSCH onto consecutive Y symbols in the PUSCH, where the second symbol is a last symbol of the X symbols, or the second symbol is a first PUSCH symbol after the X symbols, and Y is an integer greater than or equal to 1. Then mapping CSI Part 2 from the remaining resource in the PUSCH.

Figure 5:
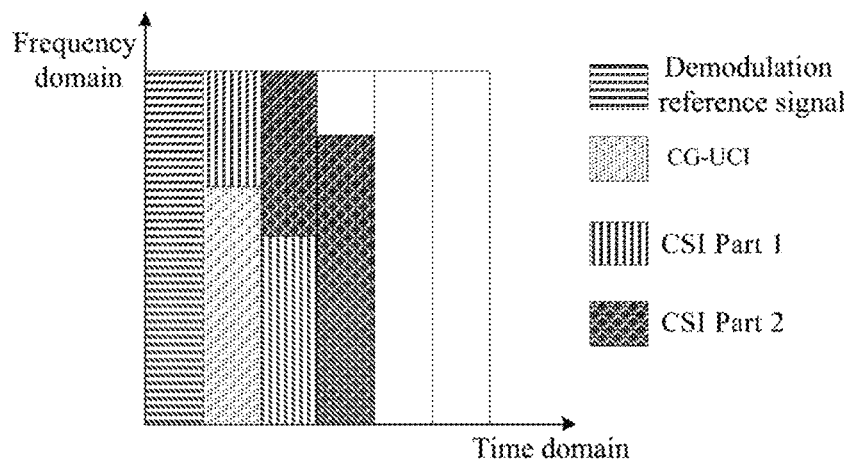
FIG. 5 is a third schematic diagram of resource mapping in a transmission method for uplink control information provided by an embodiment of the present application.

In order to better understand the embodiments of the present application, referring to FIG. 5, FIG. 5 is a third schematic diagram of resource mapping in a transmission method for uplink control information provided by an embodiment of the present application. In FIG. 5, assuming X=1 and Y=2, the second symbol is a last symbol of the X symbols.

In an embodiment, a resource occupied by the first uplink control information on the PUSCH is determined according to a first parameter, where the first parameter includes at least one of a code rate compensation factor, a resource limitation parameter, a reference code rate and a modulation order.

In an embodiment, the first parameter may be configured by the network device through high-level signaling, and/or may also be indicated through DCI signaling that activates pre-configured grant transmission.

In the embodiments of the present application, a position of the first symbol in the PUSCH and a value of X can be determined from the first parameter.

In an embodiment, in a feasible embodiment of the present application, the mapping the target uplink control information to the PUSCH including:

assuming that in a process of mapping uplink control information p to a symbol q, there are M frequency domain units to which uplink control information p has not been mapped, and there are N frequency domain units on the symbol q available for mapping the uplink control information p, then:

when M≥N, continuously mapping the uplink control information p onto the N frequency domain units in an order from a smallest frequency domain unit number to a largest frequency domain unit number;

when ceil(N/2)<M<N, continuously mapping the uplink control information p onto first M frequency domain units among the N frequency domain units in an order from a smallest frequency domain unit number to a largest frequency domain unit number, where ceil represents rounding up;

when M<ceil(N/2), mapping the uplink control information p onto M frequency domain units among the N frequency domain units, where the M frequency domain units used for mapping the uplink control information p are frequency domain units distributed with a uniform interval among the N frequency domain units.

In an embodiment, the uplink control information p includes at least one of the CG-UCI, the HARQ information, the CSI Part 1 and the CSI Part 2 described in the above embodiments.

Figure 6:
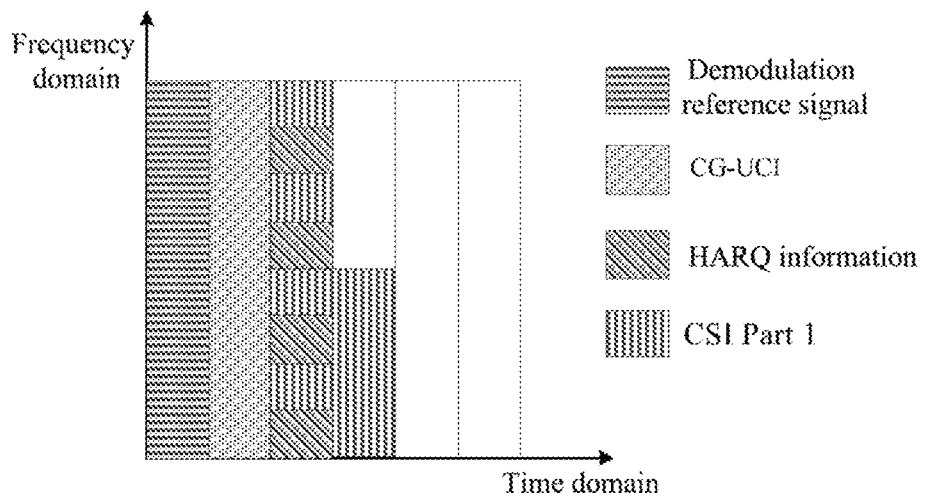
FIG. 6 is a fourth schematic diagram of resource mapping in a transmission method for uplink control information provided by an embodiment of the present application.

In order to better understand the present application, in the embodiment of the present application, the mapping diagram shown in FIG. 6 is taken as an example. Referring to FIG. 6, FIG. 6 is a fourth schematic diagram of resource mapping in a transmission method for uplink control information provided by an embodiment of the present application. In FIG. 6, it is assumed that in a process of mapping HARQ information to a second PUSCH symbol after the DMRS symbol, there are M frequency domain units to which the HARQ information has not been mapped, and there are N frequency domain units on the second PUSCH symbol after the DMRS symbol available for mapping the HARQ information, then: when M≤ceil(N/2), mapping the HARQ information onto M frequency domain units among the N frequency domain units, where the M frequency domain units used for mapping the HARQ information are frequency domain units distributed with a uniform interval among the N frequency domain units.

In the embodiment of the present application, when the target uplink control information includes CG-UCI and HARQ information, if the number of bits of HARQ information is greater than a preset threshold and there is HARQ information that needs to be transmitted, mapping the CG-UCI from a first PUSCH symbol after a first DMRS symbol in the PUSCH according to the frequency domain priority principle. After the mapping of the CG-UCI is completed, then mapping the HARQ information from remaining idle symbol(s). Since a mapping position of the CG-UCI is closer to a resource mapped with the DMRS, better demodulation performance would be achieved, which is thus beneficial for ensuring the transmission reliability of the CG-UCI.

In an embodiment, based on the content described in the above embodiments, in another feasible embodiment of the present application, in step S201, the mapping the target uplink control information to the PUSCH including:

mapping the first uplink control information from a third symbol in the PUSCH onto consecutive X symbols in the PUSCH according to a frequency domain priority principle, where a position of the third symbol is obtained from a preset parameter or configuration information sent by a network device, and X is an integer greater than or equal to 1.

In an embodiment, the first uplink control information may be CG-UCI.

In an embodiment, the target uplink control information further includes second uplink control information. In step S201, the mapping the target uplink control information to the PUSCH including:

mapping the second uplink control information from a first symbol in the PUSCH onto consecutive Y symbols in the PUSCH according to the frequency domain priority principle, where the first symbol is a first PUSCH symbol after a first DMRS symbol in the PUSCH, and Y is an integer greater than or equal to 1.

In an embodiment, the DMRS is used for correlation demodulation of a CG-PUSCH. Generally, the closer a mapping position of a resource with respect to a resource corresponding to the DMRS is, the better the demodulation performance becomes.

In an embodiment, the Y symbols include at least one symbol of the X symbols, and the second uplink control information is not mapped to a resource in the Y symbols that has been used to map the first uplink control information. That is, the second uplink control information can be mapped to other remaining resource(s) in the Y symbols other than the resource that has been used to map the first uplink control information.

In an embodiment, the second uplink control information includes HARQ information, and the number of bits of the HARQ information is greater than a preset threshold. Exemplary, the preset threshold may be 2 bits.

In the embodiment of the present application, when the target uplink control information includes CG-UCI and HARQ information, if the number of bits of the HARQ information is greater than a preset threshold and there is HARQ information that needs to be transmitted, mapping the CG-UCI from a third symbol in the PUSCH onto consecutive X symbols in the PUSCH according to the frequency domain priority principle, where the position of the third symbol is obtained from a preset parameter or configuration information sent by a network device, and X is an integer greater than or equal to 1; then, mapping the HARQ information that needs to be transmitted from a first symbol in the PUSCH onto consecutive Y symbols in the PUSCH, where the first symbol is a first PUSCH symbol after a first DMRS symbol in the PUSCH, and Y is an integer greater than or equal to 1.

In an embodiment, if the Y symbols include at least one symbol of the X symbols, it means that there are still remaining frequency domain resources in the Y symbols after the mapping of the HARQ information that needs to be transmitted is completed, and these remaining frequency domain resources can be used to map the CG-UCI.

In an embodiment, the target uplink control information further includes third uplink control information, and the third uplink control information includes a CSI Part 1.

Figure 7:
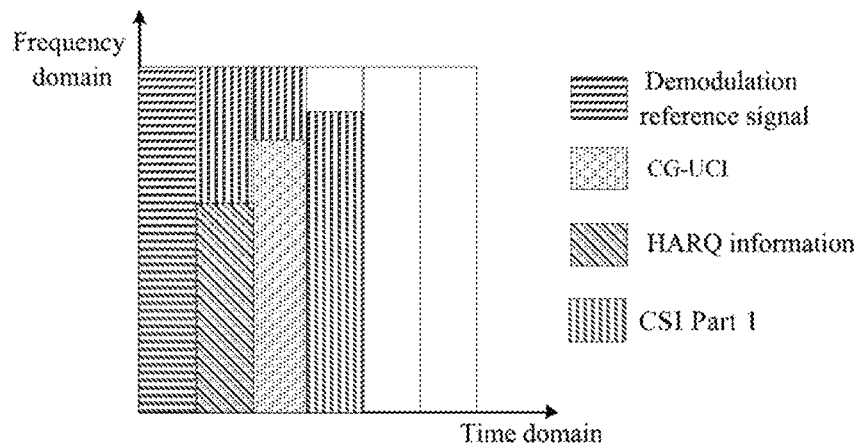
FIG. 7 is a fifth schematic diagram of resource mapping in a transmission method for uplink control information provided by an embodiment of the present application.

In order to better understand the embodiment of the present application, referring to FIG. 7, which is a fifth schematic diagram of resource mapping in a transmission method for uplink control information provided by an embodiment of the present application. In FIG. 7, assuming X=1 and Y=1, the third symbol is a second PUSCH symbol after a first DMRS symbol in the PUSCH. In an embodiment, after mapping CG-UCI to the third symbol and mapping HARQ information to the first symbol, if there are remaining frequency domain resources in the first symbol and the third symbol, then the CSI Part 1 can be mapped to the remaining frequency domain resources.

Figure 8:
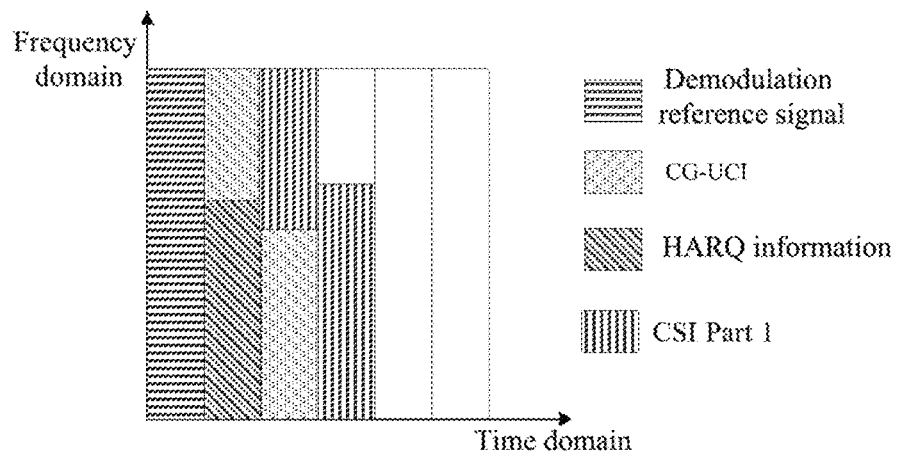
FIG. 8 is a sixth schematic diagram of resource mapping in a transmission method for uplink control information provided by an embodiment of the present application.

Referring to FIG. 8, FIG. 8 is a sixth schematic diagram of resource mapping in a transmission method for uplink control information provided by an embodiment of the present application. In FIG. 8, assuming X=2 and Y=1, the third symbol is a first PUSCH symbol after a first DMRS symbol in the PUSCH. That is, the Y symbols include at least one symbol of the X symbols.

In an embodiment, a resource occupied by the first uplink control information on the PUSCH is determined according to a first parameter, and the first parameter includes at least one of a code rate compensation factor, a resource limitation parameter, a reference code rate and a modulation order.

In an embodiment, the first parameter may be configured by the network device through high-level signaling, and/or may also be indicated through DCI signaling that activates pre-configured grant transmission.

In the embodiment of the present application, the position of the third symbol in the PUSCH and the value of X can be determined through the first parameter.

That is, in the embodiment of the present application, when the target uplink control information includes CG-UCI and HARQ information, if the number of bits of the HARQ information is greater than a preset threshold and there is HARQ information that needs to be transmitted, mapping the CG-UCI from a pre-configured mapping position according to the frequency domain priority principle, then mapping the HARQ information that needs to be transmitted from the first PUSCH symbol after the first DMRS symbol in the PUSCH. Since the mapping position of the HARQ information that needs to be transmitted is closer to the resource mapped with the DMRS, better demodulation performance would be achieved, which is thus beneficial for ensuring the transmission reliability of the HARQ information.

In an embodiment, based on the content described in the above embodiments, in another feasible embodiment of the present application, the target uplink control information includes second uplink control information, and in step S201, the mapping target uplink control information to a PUSCH including:

mapping the second uplink control information from a first symbol in the PUSCH onto consecutive Y symbols in the PUSCH according to the frequency domain priority principle, where the first symbol is a first PUSCH symbol after a first DMRS symbol in the PUSCH, and Y is an integer greater than or equal to 1.

In an embodiment, mapping the first uplink control information from a fourth symbol in the PUSCH onto consecutive Z symbols in the PUSCH according to the frequency domain priority principle, where the fourth symbol is a last symbol of the Y symbols, or the fourth symbol is a first PUSCH symbol after the Y symbols, and Z is an integer greater than or equal to 1.

In an embodiment, when the fourth symbol is the last symbol of the Y symbols, the first uplink control information is not mapped to a resource in the fourth symbol that has been used to map the second uplink control information.

In an embodiment, the DMRS is used for correlation demodulation of a CG-PUSCH. Generally, the closer a mapping position of a resource with respect to a resource corresponding to the DMRS is, the better the demodulation performance becomes.

In an embodiment, the second uplink control information includes HARQ information, and the number of bits of the HARQ information is greater than a preset threshold. Exemplary, the preset threshold may be 2 bits.

In the embodiment of the present application, when the target uplink control information includes CG-UCI and HARQ information, if the number of bits of the HARQ information is greater than a preset threshold and there is HARQ information that needs to be transmitted, mapping the HARQ information from a first symbol in the PUSCH onto consecutive Y symbols in the PUSCH according to the frequency domain priority principle, where the first symbol is a first PUSCH symbol after a first DMRS symbol in the PUSCH, and Y is an integer greater than or equal to 1. Then, mapping the first uplink control information from a fourth symbol in the PUSCH onto consecutive Z symbols in the PUSCH according to the frequency domain priority principle, where the fourth symbol is a last symbol of the Y symbols, or the fourth symbol is a first PUSCH symbol after the Y symbols, and Z is an integer greater than or equal to 1.

In an embodiment, if the fourth symbol is a last symbol of the Y symbols, it means that there is a remaining frequency domain resource(s) in the Y symbols after the mapping of the HARQ information that needs to be transmitted is completed, and the remaining frequency domain resource(s) can be used to map the CG-UCI.

In an embodiment, a resource occupied by the first uplink control information on the PUSCH is determined according to a first parameter, and the first parameter includes at least one of a code rate compensation factor, a resource limitation parameter, a reference code rate and a modulation order. Where the first parameter may be configured by a network device through high-level signaling, and/or may also be indicated through DCI signaling that activates pre-configured grant transmission.

In the embodiment of the present application, a position of the fourth symbol in PUSCH and a value of Z can be determined through the first parameter.

That is, in the embodiment of the present application, when the target uplink control information includes CG-UCI and HARQ information, if the number of bits of the HARQ information is greater than a preset threshold and there is HARQ information that needs to be transmitted, mapping the HARQ information that needs to be transmitted from a first PUSCH symbol after a first DMRS symbol in the PUSCH according to the frequency domain priority principle. Then mapping the CG-UCI to the remaining resource (s). Since the mapping position of the HARQ information that needs to be transmitted is closer to the resource mapped with the DMRS, better demodulation performance would be achieved, which is thus beneficial for ensuring the transmission reliability of the HARQ information.

In an embodiment, based on the content described in the above embodiments, in a feasible embodiment of the present application, the target uplink control information also includes third uplink control information, and in an embodiment, the second uplink control information includes HARQ information, and the third uplink control information includes a CSI Part 1; or, the second uplink control information includes the CSI Part 1, and the third uplink control information includes a CSI Part 2.

In the step S201, the mapping the target uplink control information to the PUSCH including: mapping the third uplink control information to the PUSCH.

In an embodiment, when the third uplink control information is mapped to the PUSCH, the third uplink control information is neither mapped to a resource that has been used to map the first uplink control information nor to a resource that has been used to map the second uplink control information.

It can be understood that if there is a remaining resource (s) on the symbol(s) that has been used to map the first uplink control information and/or the second uplink control information, this part of remaining resource(s) can also be used to map the third uplink control information.

In an embodiment, based on the content described in the above embodiments, in another feasible embodiment of the present application, the target uplink control information includes first uplink control information and second uplink control information, and the second uplink control information includes HARQ information; when the number of bits of the HARQ information is less than or equal to a preset threshold, the method includes at least part of the following content:

reserving a first control resource set from the first symbol before mapping the first uplink control information from the first symbol to the PUSCH, where the first control resource set includes some or all of resources in consecutive R symbols in the PUSCH starting from the first symbol, and R is an integer greater than or equal to 1.

In an embodiment, the first control resource set may be used to map the first uplink control information or not.

After reserving the first control resource set, when it is necessary to map the first uplink control information from the first symbol, it is necessary to skip the reserved resource in the R symbols.

In an embodiment, when the second uplink control information includes HARQ information that needs to be transmitted, mapping the HARQ information that needs to be transmitted to the first control resource set according to the frequency domain priority principle. When the second uplink control information does not include the HARQ information that needs to be transmitted, but includes other information, such as the CSI Part 1, the first control resource set is not used to map the second uplink control information.

In an embodiment, the HARQ information that needs to be transmitted may be mapped to the first control resource set in a punching manner.

Figure 9:
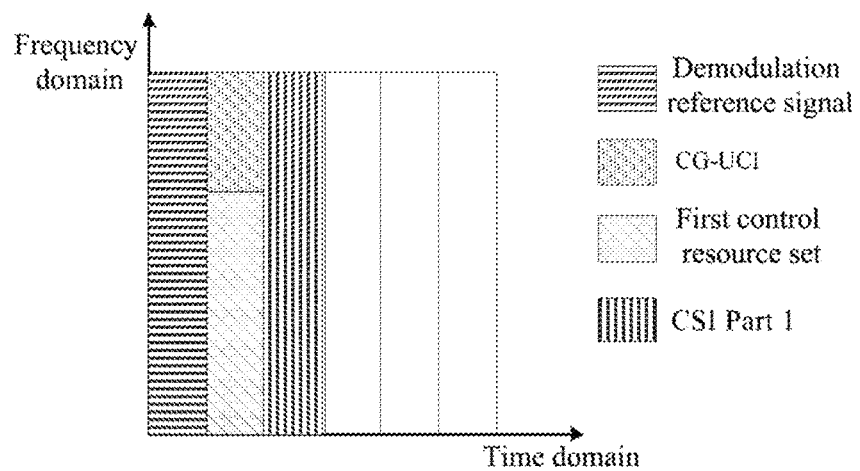
FIG. 9 is a seventh schematic diagram of resource mapping in a transmission method for uplink control information provided by an embodiment of the present application.
Figure 10:
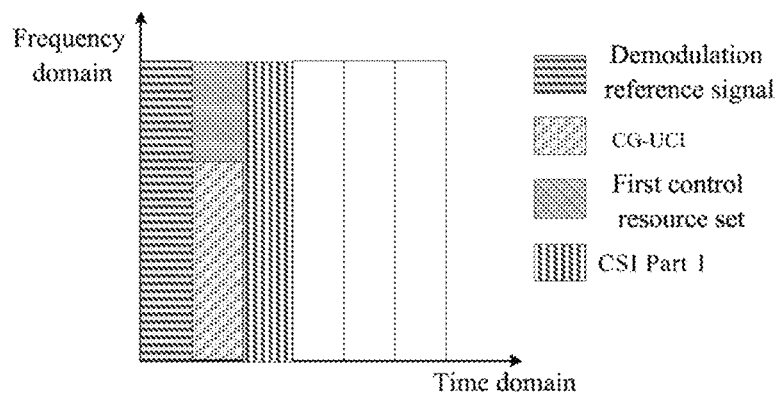
FIG. 10 is an eighth schematic diagram of resource mapping in a transmission method for uplink control information provided by an embodiment of the present application.

In order to better understand the present application, referring to FIG. 9 and FIG. 10. FIG. 9 is a seventh schematic diagram of resource mapping in a transmission method for uplink control information provided by an embodiment of the present application, and FIG. 10 is an eighth schematic diagram of resource mapping in a transmission method for uplink control information provided by an embodiment of the present application. In FIG. 9 and FIG. 10, when the number of bits of HARQ information is less than or equal to a preset threshold, reserving the first control resource set from the first symbol, and then mapping the first uplink control information from the first symbol. The first symbol is a first PUSCH symbol after a first demodulation reference signal DMRS symbol in the PUSCH.

In an embodiment, the first control resource set may be used to map the HARQ information that needs to be transmitted.

In addition, the first control resource set can also be used to map the CSI Part 2 or data.

In an embodiment, based on the content described in the above embodiments, in a feasible embodiment of the present application, the mapping the target uplink control information to the PUSCH including:

assuming that in a process of mapping uplink control information p to a symbol q, there are M frequency domain units to which the uplink control information p has not been mapped, and there are N frequency domain units on the symbol q available for mapping the uplink control information p, then:

when M≥N, continuously mapping the uplink control information p onto the N frequency domain units in an order from a smallest frequency domain unit number to a largest frequency domain unit number;

when ceil(N/2)<M<N, continuously mapping the uplink control information p onto first M frequency domain units among the N frequency domain units in an order from a smallest frequency domain unit number to a largest frequency domain unit number, where ceil represents rounding up;

when M≤ceil(N/2), mapping the uplink control information p onto the M frequency domain units among the N frequency domain units. In an embodiment, the M frequency domain units used for mapping the uplink control information p are frequency domain units distributed with a uniform interval among N frequency domain units.

In an embodiment, the uplink control information p includes at least one of the CG-UCI, the HARQ information and the CSI Part 1 described in the above embodiments.

Figure 11:
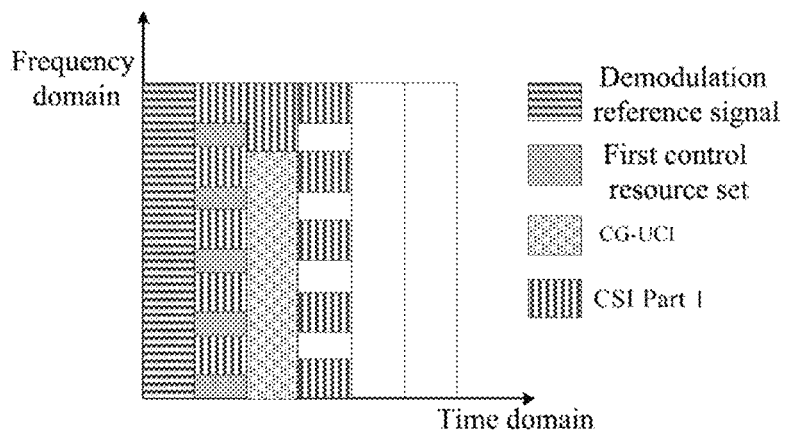
FIG. 11 is a ninth schematic diagram of resource mapping in a transmission method for uplink control information provided by an embodiment of the present application.
Figure 12:
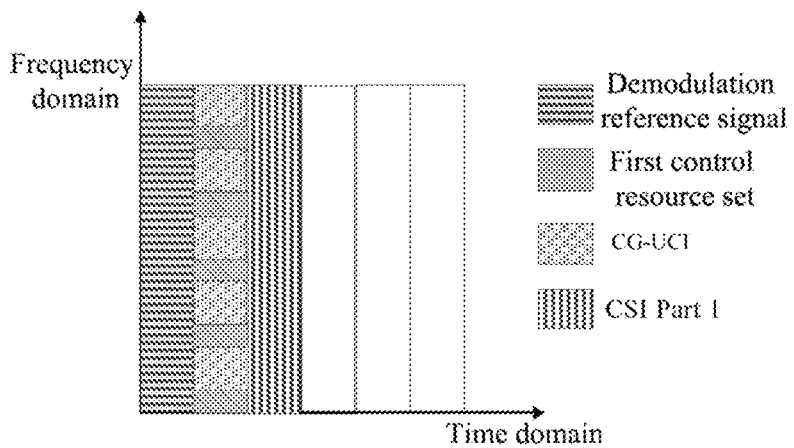
FIG. 12 is a tenth schematic diagram of resource mapping in a transmission method for uplink control information provided by an embodiment of the present application.

In order to better understand the present application, the mapping diagram shown in FIG. 9 is taken as an example in the embodiment of the present application for description. Referring to FIG. 11 and FIG. 12, FIG. 11 is a ninth schematic diagram of resource mapping in a transmission method for uplink control information provided by an embodiment of the present application. FIG. 12 is a schematic diagram of resource mapping in a transmission method for uplink control information provided by an embodiment of the present application.

In an embodiment, based on the content described in the above embodiments, in another feasible embodiment of the present application, the mapping the target uplink control information to the PUSCH including:

in a process of mapping uplink control information p to a symbol q, it is assumed that the number of frequency domain units to which the uplink control information p has not been mapped is M, the number of frequency domain units on the symbol q available for mapping the uplink control information p is N, continuously mapping the uplink control information p onto first M frequency domain units among the N frequency domain units in an order from a smallest frequency domain unit number to a largest frequency domain unit number; the uplink control information p includes at least one of the first uplink control information, the second uplink control information and the third uplink control information described in the above embodiments.

In an embodiment, based on the content described in the above embodiments, in the embodiment of the present application, cyclic redundancy check (CRC) used for encoding the first uplink control information is determined according to the second parameter. Where the second parameter is configured by a network device through high-level signaling, or the second parameter is a radio network temporary identifier (C-RNTI) corresponding to DCI signaling that activates pre-configured grant transmission.

In an embodiment, the first uplink control information further includes at least one of first indication information and second indication information. In an embodiment, the first indication information is used to indicate whether an uplink shared channel (UL-SCH) is included in the PUSCH, and the second indication information is used to indicate whether uplink scheduling request information is included.

Hereinafter, taking the target uplink control information including at least one of the CG-UCI, the HARQ, the CSI Part 1 and the CSI Part 2 as an example, the technical solutions of the embodiment of the present application will be described with reference to the example.

In an embodiment, for any type of UCI included in the target uplink control information, when mapping on a certain symbol, it is assumed that the number of frequency domain units on the symbol available for mapping the UCI is N, and the number of frequency domain units on the symbol to which the UCI needs to be mapped is M. If M is greater than or equal to N, the N frequency domain units are all used for the mapping of the UCI, that is, the UCI is continuously mapped onto the frequency domain units of the symbol; if M is less than N, M frequency domain units among the N frequency domain units are used for the mapping of the UCI, where the M frequency domain units are frequency domain units distributed with a uniform interval among the N frequency domain units. As a special case, if M is less than N but M is greater than ceil(N/2), where ceil represents rounding up. Since the number of occupied frequency domain units is greater than half of the number of all available frequency domain units of the symbol, then the M frequency domain units are first M frequency domain units among the N frequency domain units, that is, the UCI is still continuously mapped onto the frequency domain units of the symbol.

In an embodiment, for any type of UCI included in the target uplink control information, the mapping on a certain symbol may be continuous mapping.

In an embodiment, the mapping of any type of UCI included in the target uplink control information to the PUSCH follows the frequency domain priority principle.

In an optional solution, the target uplink control information includes the CG-UCI, the CSI Part 1 and the CSI Part 2. The mapping the target UCI to the PUSCH including: mapping bit sequences of the CG-UCI, the CSI Part 1 and the CSI Part 2 after rate matching onto a PUSCH symbol(s) after the first DMRS symbol of the PUSCH; a mapping order of the bit sequences is: the CG-UCI, the CSI Part 1 and the CSI Part 2; a mapping position of the bit sequences is: mapping from the first PUSCH symbol after the first DMRS symbol.

In an optional solution, the target uplink control information includes the CG-UCI, the CSI Part 1 and the CSI Part 2. The mapping the target UCI to the PUSCH including: mapping bit sequences of the CG-UCI, the CSI Part 1 and the CSI Part 2 after rate matching onto a PUSCH symbol(s) after the first DMRS symbol of the PUSCH; a mapping order of the bit sequences is: the CG-UCI, the CSI Part 1 and the CSI Part 2; mapping positions of the bit sequences is: mapping the CG-UCI from a preset symbol (such as the second PUSCH symbol after the first DMRS symbol), mapping the CSI Part 1 and the CSI Part 2 from the first PUSCH symbol after the first DMRS symbol, and skipping a resource that has been used to map the CG-UCI.

In an optional solution, the target uplink control information includes the CG-UCI, the HARQ and the CSI Part 1. The mapping the target UCI to the PUSCH including: mapping bit sequences of the CG-UCI, the HARQ and the CSI Part 1 after rate matching onto a PUSCH symbol(s) after the first DMRS symbol of the PUSCH; a mapping order of the bit sequences is: the CG-UCI, the HARQ and the CSI Part 1; a mapping position of the bit sequences is: mapping from the first PUSCH symbol after the first DMRS symbol.

In an embodiment, in the above solutions, the number of information bits of the HARQ is greater than a preset value, such as 2 bits.

In an optional solution, the target uplink control information includes the CG-UCI, the HARQ and the CSI Part 1. The mapping the target UCI to the PUSCH including: mapping bit sequences of the CG-UCI, the HARQ and the CSI Part 1 after rate matching onto a PUSCH symbol(s) after the first DMRS symbol of the PUSCH; a mapping order of the bit sequences is: the CG-UCI, the HARQ and the CSI Part 1; mapping positions of the bit sequences is: mapping the CG-UCI from a preset symbol (such as the second PUSCH symbol after the first DMRS symbol), mapping the HARQ and the CSI Part 1 from the first PUSCH symbol after the first DMRS symbol, and skipping a resource that has been used to map the CG-UCI.

In an embodiment, in the above solutions, the number of information bits of the HARQ is greater than the preset value, such as 2 bits.

In an optional solution, the target uplink control information includes the CG-UCI, the HARQ and the CSI Part 1. The mapping of the target UCI to the PUSCH including: mapping bit sequences of the CG-UCI and the CSI Part 1 after rate matching onto a PUSCH symbol(s) after the first DMRS symbol of the PUSCH, and mapping the HARQ onto the PUSCH symbol(s) in a puncturing manner; a mapping order of the bit sequences is: the CG-UCI, the CSI Part 1 and the HARQ; mapping positions of the bit sequences is: reserving a resource from the first PUSCH symbol after the first DMRS symbol, mapping the CG-UCI and the CSI Part 1 from the first PUSCH symbol after the first DMRS symbol and skipping the reserved resource, and mapping the HARQ onto the reserved resource in the punching manner.

In an embodiment, in the above solution, the number of information bits of the HARQ is less than or equal to a preset value, such as 2 bits. In an embodiment, the CSI Part 2 can also be mapped in this solution.

In an optional solution, the target uplink control information includes the CG-UCI, the HARQ and the CSI Part 1. The mapping of the target UCI to the PUSCH including: mapping bit sequences of the CG-UCI and the CSI Part 1 after rate matching onto a PUSCH symbol(s) after the first DMRS symbol of the PUSCH, and mapping the HARQ onto the PUSCH symbol(s) in a puncturing manner; a mapping order of the bit sequences is: the CG-UCI, the CSI Part 1 and the HARQ; mapping positions of the bit sequences is: reserving a resource from the first PUSCH symbol after the first DMRS symbol, mapping the CG-UCI from a preset symbol (such as the second PUSCH symbol after the first DMRS symbol), and skipping the reserved resource, mapping the CSI Part 1 from the first PUSCH symbol after the first DMRS symbol, and skipping the reserved resource and the resource that has been used to map the CG-UCI, and mapping the HARQ onto the reserved resource in the puncturing manner.

In an embodiment, in the above solution, the number of information bits of the HARQ is less than or equal to a preset value, such as 2 bits. In an embodiment, the CSI Part 2 can also be mapped in this solution.

In an optional solution, the target uplink control information includes the CG-UCI, the HARQ and the CSI Part 1. The mapping the target UCI to the PUSCH including: mapping bit sequences of the CG-UCI, the HARQ and the CSI Part 1 after rate matching onto a PUSCH symbol(s) after the first DMRS symbol of the PUSCH; a mapping order of the bit sequences is the HARQ, the CG-UCI and the CSI Part 1; a mapping position of the bit sequences is: mapping from the first PUSCH symbol after the first DMRS symbol.

In an embodiment, in the above solutions, the number of information bits of the HARQ is greater than a preset value, such as 2 bits.

In an embodiment, the embodiment of the present application also provides a transmission method for uplink control information, which is applied a network device. Referring to FIG. 13, FIG. 13 is a second flow diagram of a transmission method for uplink control information provided by an embodiment of the present application, and the method includes:

S1301: receiving a PUSCH sent by a UE through a pre-configured grant-uplink resource, where the PUSCH is mapped with target uplink control information, the target uplink control information includes first uplink control information, and the first uplink control information includes control information for demodulating the PUSCH.

In a feasible embodiment manner, the first uplink control information is mapped from a first symbol in the PUSCH onto consecutive X symbols in the PUSCH according to a frequency domain priority principle, where the first symbol is a first PUSCH symbol after a first DMRS symbol in the PUSCH, and X is an integer greater than or equal to 1.

In a feasible embodiment manner, the target uplink control information further includes second uplink control information, the second uplink control information is mapped from a second symbol in the PUSCH onto consecutive Y symbols in the PUSCH according to the frequency domain priority principle, where the second symbol is a last symbol of the X symbols, or the second symbol is a first PUSCH symbol after the X symbols, and Y is an integer greater than or equal to 1.

In an embodiment, the second symbol is the last symbol of the X symbols, and the second uplink control information is not mapped to a resource in the second symbol that has been used to map the first uplink control information.

In an embodiment, in a feasible embodiment manner, the first uplink control information is mapped from a third symbol in the PUSCH onto consecutive X symbols in the PUSCH according to a frequency domain priority principle, where a position of the third symbol is obtained from a preset parameter or configuration information sent by a network device, and X is an integer greater than or equal to 1.

In a feasible embodiment manner, the target uplink control information includes second uplink control information, and the second uplink control information is mapped from a first symbol in the PUSCH onto consecutive Y symbols in the PUSCH according to the frequency domain priority principle, where the first symbol is a first PUSCH symbol after a first DMRS symbol in the PUSCH, and Y is an integer greater than or equal to 1.

In an embodiment, the Y symbols include at least one of the X symbols, and the second uplink control information is not mapped to a resource in the Y symbols that has been used to map the first uplink control information.

In an embodiment, in a feasible embodiment manner, the target uplink control information includes second uplink control information, and the second uplink control information is mapped from a first symbol in the PUSCH onto consecutive Y symbols in the PUSCH according to a frequency domain priority principle, where the first symbol is a first PUSCH symbol after a first DMRS symbol in the PUSCH, and Y is an integer greater than or equal to 1.

In a feasible embodiment manner, the first uplink control information is mapped from a fourth symbol in the PUSCH onto consecutive Z symbols in the PUSCH according to the frequency domain priority principle, where the fourth symbol is a last symbol of the Y symbols, or the fourth symbol is a first PUSCH symbol after the Y symbols, and Z is an integer greater than or equal to 1.

In an embodiment, the fourth symbol is the last symbol of the Y symbols, and the first uplink control information is not mapped to a resource in the fourth symbol that has been used to map the second uplink control information.

In an embodiment, the target uplink control information includes second uplink control information, where the second uplink control information includes HARQ information, or the second uplink control information includes a CSI Part 1.

In an embodiment, the number of bits of the HARQ information is greater than a preset threshold.

In a feasible embodiment manner, the target uplink control information includes third uplink control information, in an embodiment, the second uplink control information includes HARQ information, and the third uplink control information includes the CSI Part 1; or,
the second uplink control information includes the CSI Part 1, and the third uplink control information includes a second channel state information part CSI Part 2.

In a feasible embodiment manner, when the third uplink control information is mapped to the PUSCH, the third uplink control information is neither mapped to a resource that has been used to map the first uplink control information nor to a resource that has been used to map the second uplink control information.

In a feasible embodiment manner, a first control resource set is reserved from the first symbol, and the first control resource set includes some or all of resources in consecutive R symbols in the PUSCH starting from the first symbol, and R is an integer greater than or equal to 1.

In an embodiment, the first control resource set is not used to map the first uplink control information; and/or,
the second uplink control information includes a CSI Part 1, and the first control resource set is not used to map the second uplink control information.

In a feasible embodiment manner, the number of bits of HARQ information included in the target uplink control information is less than or equal to a preset threshold.

In a feasible embodiment manner, the target uplink control information includes HARQ information, and the HARQ information is mapped to the first control resource set according to the frequency domain priority principle.

In a feasible embodiment manner, in a process where uplink control information p is mapped to a symbol q, the number of frequency domain units to which the uplink control information p has not been mapped is M, and the number of frequency domain units on the symbol q available for mapping the uplink control information p is N, where,
when M≥N, the uplink control information p is continuously mapped onto the N frequency domain units in an order from a smallest frequency domain unit number to a largest frequency domain unit number;
when ceil(N/2)<M<N, the uplink control information p is continuously mapped onto first M frequency domain units among the N frequency domain units in an order from a smallest frequency domain unit number to a largest frequency domain unit number, where ceil represents rounding up;
when M≥ceil(N/2), the uplink control information p is mapped onto M frequency domain units among the N frequency domain units, where the M frequency domain units used for the mapping the uplink control information p are frequency domain units distributed with a uniform interval among the N frequency domain units;
in an embodiment, the uplink control information p includes at least one of the first uplink control information, the second uplink control information and the third uplink control information.

In a feasible embodiment manner, in a process where uplink control information p is mapped to a symbol q, the number of frequency domain units to which the uplink control information p has not been mapped is M, and the number of frequency domain units on the symbol q available for mapping the uplink control information p is N, the uplink control information p is continuously mapped onto first M frequency domain units among the N frequency domain units in an order from a smallest frequency domain unit number to a largest frequency domain unit number;
in an embodiment, the uplink control information p includes at least one of the first uplink control information, the second uplink control information and the third uplink control information.

In a feasible embodiment manner, a resource occupied by the first uplink control information on the PUSCH is determined according to a first parameter, and the first parameter includes at least one of a code rate compensation factor, a resource limitation parameter, a reference code rate and a modulation order.

In a feasible embodiment manner, the first parameter is configured through high-level signaling, and/or DCI that activates pre-configured grant transmission, and the DCI is used to indicate the first parameter.

In a feasible embodiment manner, a second parameter is configured through high-level signaling, or DCI signaling that activates pre-configured grant transmission; the second parameter is used to determine CRC used by encoding of the first uplink control information, and an RNTI corresponding to the DCI signaling is used to indicate the second parameter.

In a feasible embodiment manner, the first uplink control information includes at least one of first indication information and second indication information, and the method includes:

determining whether an UL-SCH is included in the PUSCH based on the first instruction information, and/or determining whether uplink scheduling request information is included based on the second instruction information.

The embodiment of the present application provides a transmission method for uplink control information. The method includes: receiving a PUSCH sent by a UE through a pre-configured grant-uplink resource, the PUSCH being mapped with target uplink control information, the target uplink control information including first uplink control information, and the first uplink control information including control information for demodulating the PUSCH. That is, in the embodiment of the present application, the network device can receive the PUSCH sent by the UE through the pre-configured grant-uplink resource, and then detect the target uplink control information from the PUSCH.

It should be noted that functions realized by the network device described in the above embodiments are consistent with functions realized by the network device described in the embodiments corresponding to the transmission method for uplink control information applied to the UE. Reference can be made to the network device described in the above embodiments for specific contents which will not be repeated herein.

In an embodiment, an embodiment of the present application also provides a transmission apparatus for uplink control information, which is applied to a UE. Referring to FIG. 14, FIG. 14 is a module diagram of the transmission apparatus for uplink control information provided by an embodiment of the present application. The transmission apparatus 14 for uplink control information includes:

a mapping module 1401, configured to map target uplink control information to a PUSCH, where the PUSCH is transmitted through a pre-configured grant-uplink resource, the target uplink control information includes first uplink control information, and the first uplink control information includes control information for demodulating the PUSCH; and a sending module 1402, configured to send the PUSCH through the pre-configured grant-uplink resource.

The embodiment of the present application provides a transmission apparatus 14 for uplink control information. The UE maps the target uplink control information to the PUSCH, the PUSCH being transmitted through a pre-configured grant-uplink resource, the target uplink control information including first uplink control information, the first uplink control information including control information for demodulating the PUSCH; and sends the PUSCH to the network device through the pre-configured grant-uplink resource. That is, in the embodiment of the present application, when the target uplink control information needs to be transmitted, the UE can map the target uplink control information to the PUSCH, and then send the PUSCH through the pre-configured grant-uplink resource, thereby realizing the transmission of the target uplink control information.

In a feasible embodiment manner, mapping the target uplink control information to the PUSCH includes:

mapping the first uplink control information from a first symbol in the PUSCH onto consecutive X symbols in the PUSCH according to the frequency domain priority principle, where the first symbol is a first PUSCH symbol after a first demodulation reference signal DMRS symbol in the PUSCH, and X is an integer greater than or equal to 1.

In a feasible embodiment manner, the target uplink control information further includes second uplink control information, and the mapping module 1401 is configured to:

map the second uplink control information from a second symbol in the PUSCH onto consecutive Y symbols in the PUSCH according to the frequency domain priority principle, where the second symbol is a last symbol of the X symbols, or the second symbol is a first PUSCH symbol after the X symbols, and Y is an integer greater than or equal to 1.

In a feasible embodiment manner, the second symbol is the last symbol of the X symbols, and the second uplink control information is not mapped to a resource in the second symbol that has been used to map the first uplink control information.

In one possible embodiment, the mapping module 1401 is configured to:

map the first uplink control information from a third symbol in the PUSCH onto consecutive X symbols in the PUSCH according to a frequency domain priority principle, where a position of the third symbol is obtained from a preset parameter or configuration information sent by a network device, and X is an integer greater than or equal to 1.

In a feasible embodiment manner, the target uplink control information includes second uplink control information, and the mapping module 1401 is used to:

mapping the second uplink control information from a first symbol in the PUSCH onto consecutive Y symbols in the PUSCH according to the frequency domain priority principle, where the first symbol is a first PUSCH symbol after a first DMRS symbol in the PUSCH, and Y is an integer greater than or equal to 1.

In a feasible embodiment manner, the Y symbols include at least one of the X symbols, and the second uplink control information is not mapped to a resource in the Y symbols that has been used to map the first uplink control information.

In a feasible embodiment manner, the target uplink control information includes second uplink control information, and the mapping module 1401 is configured to:

map the second uplink control information from a first symbol in the PUSCH onto consecutive Y symbols in the PUSCH according to a frequency domain priority principle, where the first symbol is a first PUSCH symbol after a first DMRS symbol in the PUSCH, and Y is an integer greater than or equal to 1.

In a feasible embodiment manner, the mapping module 1401 is configured to:

map the first uplink control information from a fourth symbol in the PUSCH onto consecutive Z symbols in the PUSCH according to the frequency domain priority principle, where the fourth symbol is a last symbol of the Y symbols, or the fourth symbol is a first PUSCH symbol after the Y symbols, and Z is an integer greater than or equal to 1.

In a feasible embodiment manner, the fourth symbol is the last symbol of the Y symbols, and the first uplink control information is not mapped to a resource in the fourth symbol that has been used to map the second uplink control information.

In a feasible embodiment manner, the target uplink control information includes second uplink control information, where the second uplink control information includes hybrid automatic repeat request HARQ information, or the second uplink control information includes a first channel state information part CSI Part 1.

In a feasible embodiment manner, a number of bits of the HARQ information is greater than a preset threshold.

In a feasible embodiment manner, the target uplink control information includes third uplink control information, where the second uplink control information includes HARQ information, and the third uplink control information includes the CSI Part 1; or, the second uplink control information includes the CSI Part 1, and the third uplink control information includes a second channel state information part CSI Part 2.

In a feasible embodiment manner, the mapping module 1401 is configured to:
  map the third uplink control information to the PUSCH, where when the third uplink control information is mapped to the PUSCH, the third uplink control information is neither mapped to a resource that has been used to map the first uplink control information nor to a resource that has been used to map the second uplink control information.

In a feasible embodiment manner, the apparatus further includes:
  a reserving module, configured to reserve a first control resource set from the first symbol before mapping the target uplink control information from the first symbol to the PUSCH, where the first control resource set includes some or all of resources in consecutive R symbols in the PUSCH starting from the first symbol, and R is an integer greater than or equal to 1.

In a feasible embodiment manner, the first control resource set is not used to map the first uplink control information; and/or,
  the second uplink control information includes a CSI Part 1, and the first control resource set is not used to map the second uplink control information.

In a feasible embodiment manner, the device further includes:
  a determining module, configured to determine that a number of bits of HARQ information included in the target uplink control information is less than or equal to a preset threshold before reserving the first control resource set.

In a feasible embodiment manner, the target uplink control information includes HARQ information, and the mapping module 1401 is configured to:
  map the HARQ information to the first control resource set according to the frequency domain priority principle.

In a feasible embodiment manner, the mapping module 1401 is configured to:
  in a process of mapping uplink control information p to a symbol q, a number of frequency domain units to which the uplink control information p has not been mapped is M, and a number of frequency domain units on the symbol q available for mapping the uplink control information p is N, where,
  when M≥N, continuously map the uplink control information p onto the N frequency domain units in an order from a smallest frequency domain unit number to a largest frequency domain unit number;
  when ceil(N/2)<M<N, continuously map the uplink control information p onto first M frequency domain units among the N frequency domain units in an order from a smallest frequency domain unit number to a largest frequency domain unit number, where ceil represents rounding up;
  when M≤ceil(N/2), map the uplink control information p onto M frequency domain units among the N frequency domain units, where the M frequency domain units used for mapping the uplink control information p are frequency domain units distributed with a uniform interval among the N frequency domain units;
  where the uplink control information p includes at least one uplink control information in the target uplink control information.

In a feasible embodiment manner, the mapping module 1401 is configured to:
  in a process of mapping uplink control information p to the symbol q, a number of frequency domain units to which the uplink control information p has not been mapped is M, a number of frequency domain units on the symbol q available for mapping the uplink control information p is N, continuously map the uplink control information p onto first M frequency domain units among the N frequency domain units in an order from a smallest frequency domain unit number to a largest frequency domain unit number;
  where the uplink control information p includes at least one uplink control information in the target uplink control information.

In a feasible embodiment manner, a resource occupied by the first uplink control information on the PUSCH is determined according to a first parameter, and the first parameter includes at least one of a code rate compensation factor, a resource limitation parameter, a reference code rate and a modulation order.

In a feasible embodiment manner, the first parameter is configured by a network device through high-level signaling and/or indicated through downlink control information DCI signaling that activates pre-configured grant transmission.

In a feasible embodiment manner, cyclic redundancy check CRC used for encoding of the first uplink control information is determined according to a second parameter, where the second parameter is configured by a network device through high-level signaling, or, the second parameter is a radio network temporary identifier RNTI corresponding to DCI signaling that activates pre-configured grant transmission.

In a feasible embodiment manner, the first uplink control information includes at least one of first indication information and second indication information, where the first indication information is used to indicate whether an uplink shared channel UL-SCH is included in the PUSCH, and the second indication information is used to indicate whether uplink scheduling request information is included.

It should be noted that, for the various functions realized by the uplink control information transmission apparatus 14 and the principle of each function, reference can be made to the content described in the corresponding embodiment of the transmission method for uplink control information applied to a UE, and will not be repeated here.

In an embodiment, an embodiment of the present application also provides a transmission apparatus for uplink control information, which is applied to network device. Referring to FIG. 15, FIG. 15 is a module diagram of a transmission apparatus for uplink control information provided by an embodiment of the present application. The transmission apparatus 15 for uplink control information includes:

a receiving module 1501, configured to receive a PUSCH sent by a UE through a pre-configured grant-uplink resource, where the PUSCH is mapped with the target uplink control information, the target uplink control information includes first uplink control information, and the first uplink control information includes control information for demodulating the PUSCH.

The embodiment of the present application provides a transmission apparatus for uplink control information, which receives a PUSCH sent by a UE through a pre-configured grant-uplink resource. The PUSCH is mapped with the target uplink control information. The target uplink control information includes first uplink control information, and the first uplink control information includes control information for demodulating the PUSCH. That is, in the embodiment of the present application, the network device can receive the PUSCH sent by the UE through the pre-configured grant-uplink resource, and then detect the target uplink control information from the PUSCH.

In a feasible embodiment manner, the first uplink control information is mapped from a first symbol in the PUSCH onto consecutive X symbols in the PUSCH according to a frequency domain priority principle, where the first symbol is a first PUSCH symbol after a first DMRS symbol in the PUSCH, and X is an integer greater than or equal to 1.

In a feasible embodiment manner, the target uplink control information further includes second uplink control information, the second uplink control information is mapped from a second symbol in the PUSCH onto consecutive Y symbols in the PUSCH according to the frequency domain priority principle, where the second symbol is a last symbol of the X symbols, or the second symbol is a first PUSCH symbol after the X symbols, and Y is an integer greater than or equal to 1.

In a feasible embodiment manner, the second symbol is the last symbol of the X symbols, and the second uplink control information is not mapped onto a resource in the second symbol that has been used to map the first uplink control information.

In a feasible embodiment manner, the first uplink control information is mapped from a third symbol in the PUSCH onto consecutive X symbols in the PUSCH according to a frequency domain priority principle, where a position of the third symbol is obtained from a preset parameter or configuration information sent by a network device, and X is an integer greater than or equal to 1.

In a feasible embodiment manner, the target uplink control information includes second uplink control information, and the second uplink control information is mapped from the first symbol in the PUSCH onto consecutive Y symbols in the PUSCH according to the frequency domain priority principle, where the first symbol is a first PUSCH symbol after a first DMRS symbol in the PUSCH, and Y is an integer greater than or equal to 1.

In a feasible embodiment manner, the Y symbols include at least one of the X symbols, and the second uplink control information is not mapped onto a resource in the Y symbols that has been used to map the first uplink control information.

In a feasible embodiment manner, the target uplink control information includes second uplink control information, and the second uplink control information is mapped from a first symbol in the PUSCH onto consecutive Y symbols in the PUSCH according to a frequency domain priority principle, where the first symbol is a first PUSCH symbol after a first DMRS symbol in the PUSCH, and Y is an integer greater than or equal to 1.

In a feasible embodiment manner, the first uplink control information is mapped from a fourth symbol in the PUSCH onto consecutive Z symbols in the PUSCH according to the frequency domain priority principle, where the fourth symbol is a last symbol of the Y symbols, or the fourth symbol is a first PUSCH symbol after the Y symbols, Z is an integer greater than or equal to 1.

In a feasible embodiment manner, the fourth symbol is a last symbol of the Y symbols, and the first uplink control information is not mapped onto a resource in the fourth symbol that has been used to map the second uplink control information.

In a feasible embodiment manner, the target uplink control information includes second uplink control information, where the second uplink control information includes HARQ information, or the second uplink control information includes the CSI Part 1.

In a feasible embodiment manner, a number of bits of the HARQ information is greater than a preset threshold.

In a feasible embodiment manner, the target uplink control information includes third uplink control information, where the second uplink control information includes HARQ information, and the third uplink control information includes the CSI Part 1; or, the second uplink control information includes the CSI Part 1, and the third uplink control information includes CSI Part 2.

In a feasible embodiment manner, when the third uplink control information is mapped on the PUSCH, the third uplink control information is neither mapped to a resource that has been used to map the first uplink control information nor to a resource that has been used to map the second uplink control information.

In a feasible embodiment manner, a first control resource set is reserved from the first symbol, the first control resource set includes some or all of resources in consecutive R symbols in the PUSCH starting from the first symbol, and R is an integer greater than or equal to 1.

In a feasible embodiment manner, the first control resource set is not used to map the first uplink control information; and/or, the second uplink control information includes a CSI Part 1, and the first control resource set is not used to map the second uplink control information.

In a feasible embodiment manner, a number of bits of HARQ information included in the target uplink control information is less than or equal to a preset threshold.

In a feasible embodiment manner, the target uplink control information includes HARQ information, and the HARQ information is mapped to the first control resource set according to the frequency domain priority principle.

In a feasible embodiment manner, in a process where uplink control information p is mapped to a symbol q, a number of frequency domain units to which the uplink control information p has not been mapped is M, and a number of frequency domain units on the symbol q available for mapping the uplink control information p is N, where, when M≥N, the uplink control information p is continuously mapped onto the N frequency domain units in an order from a smallest frequency domain unit number to a largest frequency domain unit number;

when ceil(N/2)<M<N, the uplink control information p is continuously mapped onto first M frequency domain units among the N frequency domain units in an order from a smallest frequency domain unit number to a largest frequency domain unit number, where ceil represents rounding up;

when M≤ceil(N/2), the uplink control information p is mapped onto M frequency domain units among the N frequency domain units, where the M frequency domain units used for mapping the uplink control information p are frequency domain units distributed with a uniform interval among the N frequency domain units;

where the uplink control information p includes at least one uplink control information in the target uplink control information.

In a feasible embodiment manner, in a process where uplink control information p is mapped to a symbol q, a number of frequency domain units to which the uplink control information p has not been mapped is M, and a number of frequency domain units on the symbol q available for mapping the uplink control information p is N, and the uplink control information p is continuously mapped onto the first M frequency domain units among the N frequency domain units in an order from a smallest frequency domain unit number to a largest frequency domain unit number;

where the uplink control information p includes at least one uplink control information in the target uplink control information.

In a feasible embodiment manner, a resource occupied by the first uplink control information on the PUSCH is determined according to a first parameter, and the first parameter includes at least one of a code rate compensation factor, a resource limitation parameter, a reference code rate and a modulation order.

In a feasible embodiment manner, the first parameter is configured through high-level signaling, and/or DCI that activates pre-configured grant transmission, and the DCI is used to indicate the first parameter.

In a feasible embodiment manner, a second parameter is configured through high-level signaling, or DCI signaling that activates pre-configured grant transmission; the second parameter is used to determine the CRC used by encoding of the first uplink control information, and an RNTI corresponding to the DCI signaling is used to indicate the second parameter.

In a feasible embodiment manner, the first uplink control information includes at least one of first indication information and second indication information, and the device includes:

a determining module, configured to determine whether an uplink shared channel UL-SCH is included in the PUSCH based on the first indication information, and/or determine whether uplink scheduling request information is included based on the second indication information.

It should be noted that the various functions realized by the transmission apparatus 15 for uplink control information and the principle of each function can refer to the content described in the embodiment corresponding to the transmission method for uplink control information applied to a UE or the content described in the embodiment corresponding to the transmission method for uplink control information applied to a network device, and will not be repeated here.

In an embodiment, the embodiment of the present application also provides a user equipment, including: at least one processor and memory; the memory stores computer execution instructions; the at least one processor executes the computer execution instructions stored in the memory so that the at least one processor executes the transmission method for uplink control information as described in FIG. 2.

In an embodiment, the embodiment of the present application also provides a network device, including: at least one processor and memory; the memory stores computer execution instructions; the at least one processor executes the computer execution instructions stored in the memory so that the at least one processor executes the transmission method for uplink control information as described in FIG. 13.

The user equipment and network device provided by the above embodiments can be used to implement the technical solutions of each embodiment in the transmission method for uplink control information respectively, the implementation principle and technical effect are similar, which will not be repeated herein.

Figure 16:
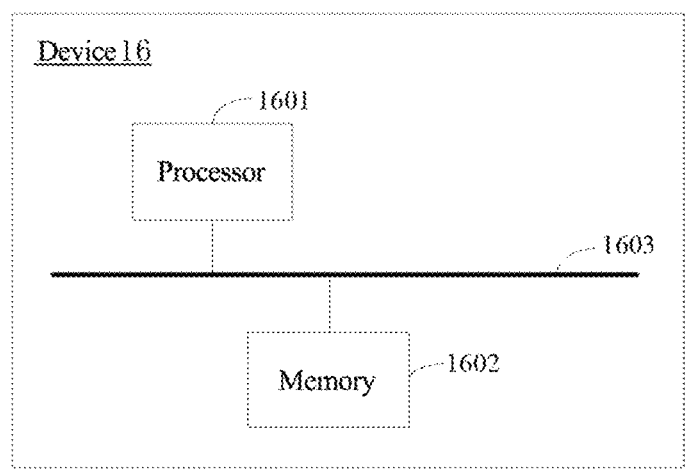
FIG. 16 is schematic diagram of a hardware structure of an electronic device provided by an embodiment of the present application.

In order to better understand the embodiments of the present application, reference can be made to FIG. 16, which is a schematic diagram of a hardware structure of a device provided by an embodiment of the present application. As shown in FIG. 16, when the device 16 is the UE shown in FIG. 1, the device 16 includes: a processor 1601 and a memory 1602; where, the memory 1602 is configured to store computer execution instructions;

the processor 1601 is configured to execute the computer execution instructions stored in the memory to implement each step executed by the UE in the above embodiments. For details, please refer to the relevant description in the above method embodiments.

Alternatively, when the device 16 is a network device shown in FIG. 1, the device 16 includes a processor 1601 and a memory 1602; where, the memory 1602 is configured to store computer execution instructions;

the processor 1601 is configured to execute the computer execution instructions stored in the memory to implement each step executed by the network device in the above embodiments. For details, please refer to the relevant description in the above method embodiments.

In an embodiment, the memory 1602 may be independent or integrated with the processor 1601.

When the memory 1602 is set independently, the device 16 also includes a bus 1603 for connecting the memory 1602 and the processor 1601.

The embodiment of the present application also provides a computer-readable storage medium in which computer execution instructions are stored. When the processor executes the computer execution instructions, the transmission method for uplink control information applied to the UE as described above is implemented.

The embodiment of the present application also provides a computer-readable storage medium in which computer execution instructions are stored. When the processor executes the computer execution instructions, the transmission method for uplink control information applied to the network devices as described above is implemented.

The computer-readable storage mediums provided by the above embodiments can be used to execute the technical solutions in each embodiment of the transmission method for uplink control information, respectively, and the implementation principle and technical effect are similar, which will not be repeated herein.

In several embodiments provided in the present application, it should be understood that the disclosed devices and methods may be implemented in other ways. For example, the device embodiments described above are only illustrative. For example, the division of the modules is only a logical function division, and there can be other division manners in actual implementations, for example, multiple modules can be combined or integrated into another system, or some features can be ignored or not executed. On the other hand, the mutual coupling or direct coupling or communication connections shown or discussed may be indirect coupling or communication connections through some interfaces, devices or modules, and may be in electrical, mechanical or other forms.

The module described as a separate component may or may not be physically separated, and the component displayed as a module may or may not be a physical unit, that is, it may be located in one place or distributed to multiple network units. Some or all of the modules can be selected according to actual needs to achieve the purpose of the solutions of the embodiments.

In addition, each functional module in each embodiment of the present application may be integrated into one processing unit, or each module may exist separately, or two or more modules may be integrated into one unit. The units formed by the above modules can be implemented in the form of hardware, or hardware plus software functional units.

The above integrated module implemented in the form of software function module may be stored in a computer-readable storage medium. The software function module is stored in a storage medium and includes several instructions to enable a computer device (which may be a personal computer, a server, a network device, etc.) or a processor (English: processor) to perform some steps of the methods described in various embodiments of the present application.

It should be understood that the processor may be a central processing unit (English: Central Processing Unit, abbreviated as: CPU), or other general-purpose processors, digital signal processors (English: Digital Signal Processor, abbreviated as: DSP), and application specific integrated circuits (English: Application Specific Integrated Circuit, abbreviated as: ASIC), etc. The general-purpose processor may be a microprocessor or the processor may also be any conventional processor or the like. The steps of the method disclosed in combination with the present application can be directly reflected in the execution completion of the hardware processor, or the combination of hardware and software modules in the processor.

The memory may include a high-speed RAM memory, and may also include a nonvolatile storage NVM, such as at least one disk memory, and may also be a USB flash disk, a mobile hard disk, a read-only memory, a disk or an optical disc.

The bus may be an industry standard architecture (Industry Standard Architecture, ISA) bus, a peripheral component (PCI) bus or an extended industry standard architecture (Extended Industry Standard Architecture, EISA) bus, etc. The bus can be divided into an address bus, a data bus, a control bus and so on. For ease of representation, the bus in the drawings of the present application is not limited to only one bus or one type of bus.

The storage medium can be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The storage medium may be any available medium that can be accessed by a general-purpose or special-purpose computer.

An exemplary storage medium is coupled to the processor, so that the processor can read information from the storage medium and write information to the storage medium. Of course, the storage medium may also be an integral part of the processor. The processor and the storage medium may be located in application specific integrated circuits (Application Specific Integrated Circuits, abbreviated as: ASIC). Of course, the processor and storage medium may also exist in electronic devices or main control devices as discrete components.

Those skilled in the art can understand that all or part of the steps for implementing the above method embodiments can be completed by hardware related to program instructions. The aforementioned program can be stored in a computer-readable storage medium. When the program is executed, the steps including the above method embodiments are executed; the aforementioned storage medium includes various mediums that can store program codes, such as ROMs, RAMs, magnetic disks or optical disks.

Finally, it should be noted that the above embodiments are only used to illustrate the technical solutions of the present application, rather than limiting the technical solutions; although the present application has been described in detail with reference to the above embodiments, those skilled in the art should understand that they can still modify the technical solutions described in the above embodiments, or make equivalent replacement for some or all of the technical features; these modifications or replacements do not make the essence of the corresponding technical solutions depart from the scope of the technical solutions of the embodiments of the present application.

What is claimed is:

1. A transmission method for uplink control information which is applied to a user equipment (UE), and the method comprises:
    mapping target uplink control information to a physical uplink shared channel (PUSCH), wherein the PUSCH is transmitted through a pre-configured grant-uplink resource, the target uplink control information comprises first uplink control information, and the first uplink control information comprises control information for demodulating the PUSCH; and
    sending the PUSCH through the pre-configured grant-uplink resource;
    wherein mapping the target uplink control information to the PUSCH comprises:
        mapping the first uplink control information from a first symbol in the PUSCH onto consecutive X symbols in the PUSCH according to a frequency domain priority principle, wherein the first symbol is a first PUSCH symbol after a first demodulation reference signal DMRS symbol in the PUSCH, and X is an integer greater than or equal to 1;
    wherein the target uplink control information further comprises second uplink control information, and mapping the target uplink control information to the PUSCH comprises:
        mapping the second uplink control information from a second symbol in the PUSCH onto consecutive Y symbols in the PUSCH according to the frequency domain priority principle, wherein the second symbol is a last symbol of the X symbols, and Y is an integer greater than or equal to 1.

2. The method according to claim 1, wherein,
    the first uplink control information comprises: configured grant-uplink control information (CG-UCI);

the first uplink control information does not comprise: hybrid automatic repeat request (HARQ).

3. The method according to claim 1, wherein the second symbol is the last symbol of the X symbols, and the second uplink control information is not mapped to a resource in the second symbol that has been used to map the first uplink control information.

4. The method according to claim 1, wherein the target uplink control information comprises second uplink control information, and the second uplink control information comprises a first channel state information part (CSI Part 1).

5. The method according to claim 4, wherein the target uplink control information comprises third uplink control information, the second uplink control information comprises the CSI Part 1, and the third uplink control information comprises a second channel state information part (CSI Part 2).

6. The method according to claim 5, wherein mapping the target uplink control information to the PUSCH comprises: mapping the third uplink control information to the PUSCH, wherein when the third uplink control information is mapped to the PUSCH, the third uplink control information is neither mapped to a resource that has been used to map the first uplink control information nor to a resource that has been used to map the second uplink control information.

7. A user equipment (UE), comprising: at least one processor and a memory;
the memory stores computer execution instructions;
the at least one processor, when executing the computer execution instructions stored in the memory, is caused to:
map target uplink control information to a physical uplink shared channel (PUSCH), wherein the PUSCH is transmitted through a pre-configured grant-uplink resource, the target uplink control information comprises first uplink control information, and the first uplink control information comprises control information for demodulating the PUSCH; and
send the PUSCH through the pre-configured grant-uplink resource;
wherein the at least one processor is caused to:
map the first uplink control information from a first symbol in the PUSCH onto consecutive X symbols in the PUSCH according to a frequency domain priority principle, wherein the first symbol is a first PUSCH symbol after a first demodulation reference signal DMRS symbol in the PUSCH, and X is an integer greater than or equal to 1;
wherein the target uplink control information further comprises second uplink control information, and the at least one processor is further caused to:
map the second uplink control information from a second symbol in the PUSCH onto consecutive Y symbols in the PUSCH according to the frequency domain priority principle, wherein the second symbol is a last symbol of the X symbols, and Y is an integer greater than or equal to 1.

8. The UE according to claim 7, wherein,
the first uplink control information comprises: configured grant-uplink control information (CG-UCI);
the first uplink control information does not comprise: hybrid automatic repeat request (HARQ).

9. The UE according to claim 7, wherein the second symbol is the last symbol of the X symbols, and the second uplink control information is not mapped to a resource in the second symbol that has been used to map the first uplink control information.

10. The UE according to claim 7, wherein the target uplink control information comprises second uplink control information, and the second uplink control information comprises a first channel state information part (CSI Part 1).

11. The UE according to claim 10, wherein the target uplink control information comprises third uplink control information, the second uplink control information comprises the CSI Part 1, and the third uplink control information comprises a second channel state information part (CSI Part 2).

12. The UE according to claim 11, wherein the at least one processor is configured to:
map the third uplink control information to the PUSCH, wherein when the third uplink control information is mapped to the PUSCH, the third uplink control information is neither mapped to a resource that has been used to map the first uplink control information nor to a resource that has been used to map the second uplink control information.

13. A network device, comprising: at least one processor and a memory;
the memory stores computer execution instructions;
the at least one processor, when executing the computer execution instructions stored in the memory, is caused to:
receive a physical uplink shared channel (PUSCH) sent by a user equipment (UE) through a pre-configured grant-uplink resource, wherein the PUSCH is mapped with target uplink control information, the target uplink control information comprises first uplink control information, and the first uplink control information comprises control information for demodulating the PUSCH;
wherein the first uplink control information is mapped from a first symbol in the PUSCH onto consecutive X symbols in the PUSCH according to a frequency domain priority principle, wherein the first symbol is a first PUSCH symbol after a first demodulation reference signal (DMRS) symbol in the PUSCH, and X is an integer greater than or equal to 1;
wherein the target uplink control information further comprises second uplink control information, the second uplink control information is mapped from a second symbol in the PUSCH onto consecutive Y symbols in the PUSCH according to the frequency domain priority principle, wherein the second symbol is a last symbol of the X symbols, and Y is an integer greater than or equal to 1.

14. The network device according to claim 13, wherein,
the first uplink control information comprises: configured grant-uplink control information (CG-UCI);
the first uplink control information does not comprise: hybrid automatic repeat request (HARQ).

15. The network device according to claim 13, wherein the second symbol is the last symbol of the X symbols, and the second uplink control information is not mapped to a resource in the second symbol that has been used to map the first uplink control information.

16. The network device according to claim 13, wherein the target uplink control information comprises second uplink control information, and the second uplink control information comprises a first channel state information (CSI Part 1).

17. The network device according to claim 16, wherein the target uplink control information comprises third uplink control information, the second uplink control information comprises the CSI Part 1, and the third uplink control information comprises a second channel state information part (CSI Part 2).

18. The network device according to claim 17, wherein when the third uplink control information is mapped to the PUSCH, the third uplink control information is neither mapped to a resource that has been used to map the first uplink control information nor to a resource that has been used to map the second uplink control information.

* * * * *